United States Patent
Gamaley

(10) Patent No.: US 9,996,705 B2
(45) Date of Patent: *Jun. 12, 2018

(54) DETERMINING POTENTIAL SHARING OF PRIVATE DATA ASSOCIATED WITH A PRIVATE NETWORK DOMAIN TO IMPROVE DATA SECURITY

(71) Applicant: International Business Machines Corporation, Armonk, NY (US)

(72) Inventor: Vladimir Gamaley, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 14/799,128

(22) Filed: Jul. 14, 2015

(65) Prior Publication Data

US 2017/0019364 A1   Jan. 19, 2017

(51) Int. Cl.
*G06F 21/62* (2013.01)
*H04L 12/58* (2006.01)
*H04L 29/08* (2006.01)

(52) U.S. Cl.
CPC ...... *G06F 21/6245* (2013.01); *G06F 21/6263* (2013.01); *H04L 51/14* (2013.01); *H04L 51/32* (2013.01); *H04L 67/327* (2013.01)

(58) Field of Classification Search
CPC . G06F 21/6245; G06F 21/6263; H04L 51/14; H04L 51/32; H04L 67/327
See application file for complete search history.

(56) References Cited

U.S. PATENT DOCUMENTS

| 8,504,481 | B2  |   | 8/2013 | Motahari et al. |
|-----------|-----|---|--------|-----------------|
| 8,887,300 | B1  |   | 11/2014 | Gates et al. |
| 9,411,671 | B1  | * | 8/2016 | Johnson ............ G06F 11/0781 |
| 9,691,107 | B2  | * | 6/2017 | Lyren .................. G06Q 50/01 |
| 9,703,870 | B2  | * | 7/2017 | Katic ............. G06F 17/30864 |
| 2012/0150971 | A1 |   | 6/2012 | Bahrainwala et al. |
| 2014/0032672 | A1 |   | 1/2014 | Yoshikawa et al. |
| 2015/0113664 | A1 | * | 4/2015 | Aad ................. G06K 9/00288 |
|           |     |   |        | 726/27 |

(Continued)

FOREIGN PATENT DOCUMENTS

WO   2012161682 A1   11/2012
WO   2013173395 A2   11/2013

OTHER PUBLICATIONS

List of IBM Patents or Patent Applications Treated as Related, May 4, 2016, 1 page.

(Continued)

*Primary Examiner* — Larry Donaghue
(74) *Attorney, Agent, or Firm* — Reza Sarbakhsh; SVL IP Law Edell, Shapiro & Finnan, LLC

(57) ABSTRACT

Techniques for determining potential sharing of private data are described herein. The techniques may include identifying content having computer readable access rules associated with a private domain of a social network, and identifying private data of the content. A potential share of the content outside of the private domain is detected and a search of the potential share to determine whether the potential share is associated with the private data is performed. The techniques may also include detecting a match between the potential share and the private data.

17 Claims, 4 Drawing Sheets

(56) References Cited

U.S. PATENT DOCUMENTS

2015/0312328 A1* 10/2015 Banatwala ............ H04L 65/403
 709/204
2017/0186123 A1* 6/2017 Shelton ................ G06Q 50/265

OTHER PUBLICATIONS

Ozgur Kafali et al., "Detecting and Predicting Privacy Violations in Online Social Networks", Springer, Distributed and Parallel Databases, Mar. 2014, vol. 32, Issue 1, pp. 161-190. Accessible online at http://dx.doi.org/10.1007/s10619-013-7124-8.

* cited by examiner

300

DETERMINING POTENTIAL SHARING OF PRIVATE DATA ASSOCIATED WITH A PRIVATE NETWORK DOMAIN TO IMPROVE DATA SECURITY

BACKGROUND

1. Technical Field

Present invention embodiments relate generally to sharing in social networks. More specifically, the techniques described herein include detecting potential sharing of private data.

2. Discussion of the Related Art

Preventing private data from being released is a growing concern. For example, a computer-enabled social network may include private domains and public domains. One or more members of a private domain may generate content that is intended to be private. In some cases, when the content is created, an author of the content may be prompted to indicate access rules specifying how the content may be shared. For example, the social network may prompt the author to specify one or more people or groups of people that are authorized to view the content. However, some members having access to private content may attempt to share the private content outside of the private domain.

SUMMARY

In one embodiment, a method for determining a potential share of private data is described herein. The method includes identifying content having computer readable access rules associated with a private domain of a social network, and performing, a search of the content to identify private data. A potential share of the content outside of the private domain is detected and a search of the potential share to determine whether the potential share is associated with the private data is performed. The method may also include detecting a match between the potential share and the private data. According to other embodiments of the present invention, machines, systems, computer-implemented methods and computer program products for determining a potential share of private data are provided.

DETAILED DESCRIPTION

The subject matter disclosed herein relates to techniques for determining private data leaks. Preventing private data from being released is a growing concern. For example, a computer-enabled social network may include private domains and public domains. One or more members of a private domain may generate content that is intended to be private. In some cases, when the content is created, an author of the content may be prompted to indicate access rules specifying how the content may be shared. For example, the social network may prompt the author to specify one or more people or groups of people that are authorized to view the content. However, some members having access to private content may attempt to share the private content outside of the private domain.

The techniques described herein include reducing sharing of content having private data by determining whether a potential share of content contains private data. More specifically, when a user attempts to potentially share content, the potentially shared content is searched to determine if any of the potentially shared content matches content that is associated with restricted access rules. The search may include searching the content itself as well as metadata associated with the content to determine a match with private data.

A private domain, as referred to herein, is a status of content shared within a social network. In some cases, content may be considered to be in the private domain when shared within a group having restricted access within the social network. For example, content shared, generated, or created within a restricted access group may inherently be considered to include data in the private domain. In some cases, content may be considered to be in the private domain when a creator, author, administrator, or the like explicitly indicate access rules specifying who may access the content.

Content, as referred to herein, may include text documents, media objects such as audio, image, video objects, and the like. The content may also be associated with metadata. Metadata, as referred to herein, may include any data associated with the content that is not necessarily within the content itself, such as a file name, size, creation date, length, one or more authors of the content, type of content such as whether it is a text document, a media document, and the like.

Figure 1:
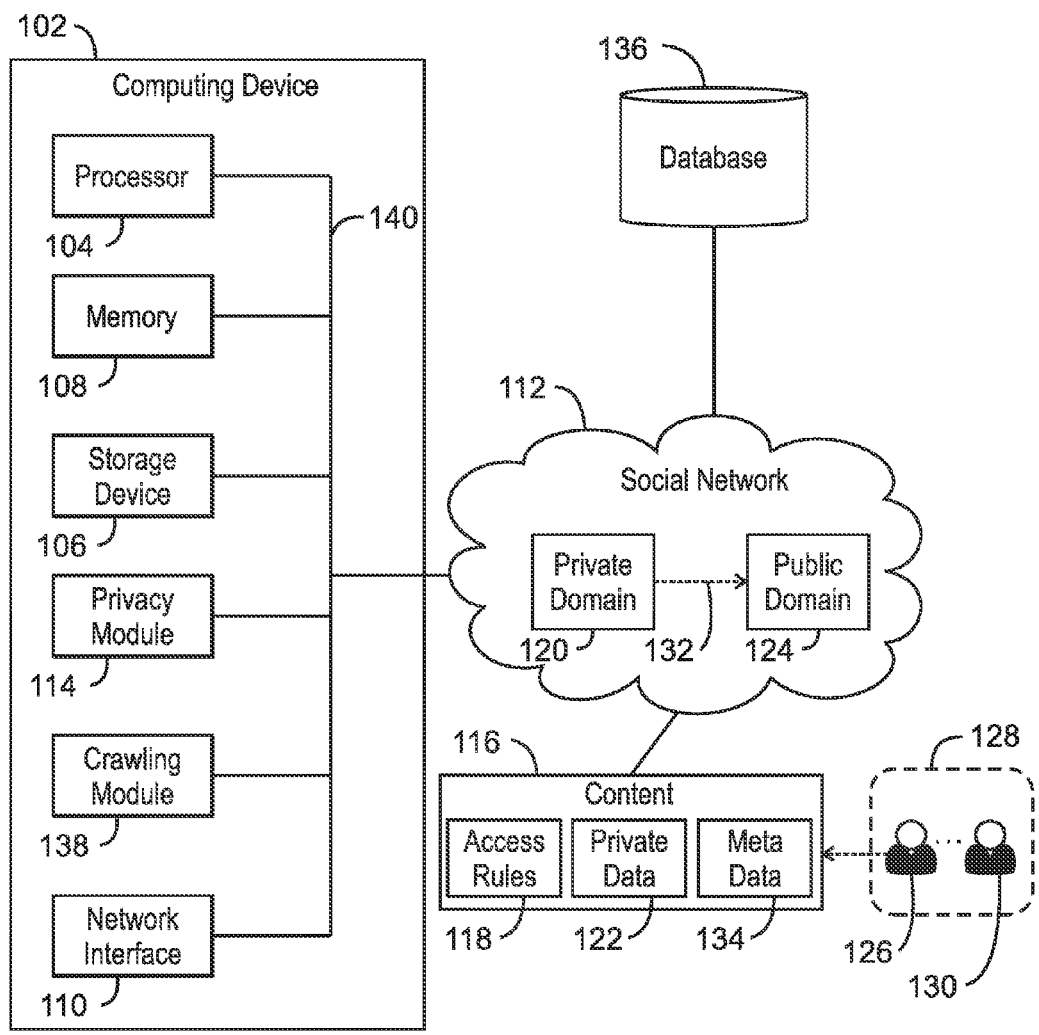
FIG. 1 is a block diagram of an example computing system configured to detect potential sharing of private data in accordance with an embodiment of the invention.

FIG. 1 is a block diagram of an example computing system, for use with present invention embodiments, configured to detect potential sharing of private data. The computing system 100 may include a computing device 102 having a processor 104, a storage device 106 comprising a non-transitory computer-readable medium, a memory device 108, and a network interface 110.

Computing device 102 enables users to submit documents for sharing (e.g., documents potentially having private data) to the public domain 124 of the social network 112. Computing device 102 may present a graphical user GUI, etc.) or other interface (e.g., command line prompts, menu screens, etc.) with which to share content, and may provide reports including analysis results (e.g., content of a potential share that is determined to match private data 122 or metadata 134, content stored in database 136, access rules 118, users 126, 130, or user groups 128, etc.).

The computing device 102 may be associated with a social network 112. The computing device 102 may include a privacy module 114 configured to determine potential private data leak(s).

The privacy module 114 may be logic, at least partially comprising hardware logic. For example, the privacy module 114 may be electronic circuitry logic, firmware of a microcontroller, or the like. In other embodiments, the privacy module 114 may be implemented as instructions executable by a processing device, such as the processor 104. The instructions may direct the processor 104 to identify content 116 having computer readable access rules 118 associated with a private domain 120 of the social network 112, and identify private data 122 of the content 116. The privacy module 114 may be configured to detect a potential share of the content 116 outside of the private domain 120. For example, the content 116 may be attempted to be shared to a public domain 124 of the social network 112.

As illustrated in FIG. 1, the content 116 may, in some cases, be generated by a user 126. The user 126 may be a first user and may be a member of a private group 128 including other users such as a second user 130 of the social network 112. In some cases, when the first user 126 created the content 116, the first user 126 may have indicated access rules 118 such as a blacklist of users (not shown) who are not authorized to view the content 116, a whitelist of users (such as the user 130) who are authorized to view the content, and the like. As discussed above, the second user 130 may also be a member of the private group 128. The second user 130 may attempt to share the content with the public domain 124.

In some cases, it may be difficult to determine whether content being shared with the public domain 124 includes the private data 122. For example, portions of text in the private data 122 may be copied to a new document before being shared with the public domain. In other cases, the content 116 may be modified by resaving the content 116 with a different title. In other words, a potential share, indicated by the dashed arrow 132, may not be merely sharing of the content 116 directly, but may be sharing portions of the content 116, modifications of the content 116, similar content that matches private data 122 of the content 116, and the like.

The social network 112 may be configured to enumerate data associated with the content 116 including the private data 122 as well as metadata 134 by storing these types of indicators in a database 136. Metadata 134 may include content descriptors such as file name, file size, one or more authors of the content 116, date of creation, context of creation (such as whether the content was generated within the private group 128), and the like. Upon detection of the potential share 132, the privacy module 114 may be configured to perform a search to determine whether the potential share will release the private data 122 of the content 116 to the public domain 124. Performing the search of the potential share 132 comprises determining metadata (not shown) of the potential share 132. Performing the search of the content 116 to identify private data 122 comprises identifying a degree of overlap between the metadata 134 associated with the content and the metadata (not shown) of the potential share 132. The search may crawl the database 136 via a crawling module 138. The crawling module 138 may be logic, at least partially comprising hardware logic. For example, the crawling module 138 may be electronic circuitry logic, firmware of a microcontroller, or the like. In some embodiments, the crawling module 138 may be implemented as instructions executable by a processing device, such as the processor 104. In some cases, modules such as the privacy module 114 and the crawling module 138 may be separate modules, however, the modules 114 and 138 may be integrated modules, or may be modules of a larger process. In any case, by crawling the database 136, a match may be determined indicating that content of the potential share 132 matches private data 122 of the content 116.

A database system 136 may store various information for the analysis (e.g., private data 122, metadata 134, user group information 128, access rules 118, etc.). The database system 136 may be implemented by any conventional or other database or storage unit, may be local to or remote from computing device 102, and may communicate via any appropriate communication medium local area network (LAN), wide area network (WAN), Internet, hardwire, wireless link, Intranet, etc.).

In some cases, the match may be based on a degree of overlap between the potential share 132 and the private data 122 of the content 116. For example, the match may be based on a configurable threshold wherein if a percentage of the potential share 132 overlaps with the private data 122 then a match is indicated. As discussed in more detail below in regard to FIG. 2 and FIG. 3, once a match is indicated, a user may be notified. For example, the privacy module 114 may be configured to notify the first user 126 who created the content 116. In some cases, the privacy module 114 may notify the second user 130 that the content in the potential share 132 includes an overlap with private data 122. In some cases, the potential share 132 may be delayed until the first user 126 authorizes a release to enable the potential share 132 with the public domain 124.

The processor 104 may be a main processor that is adapted to execute the stored instructions. The processor 104 may be a single core processor, a multi-core processor, a computing cluster, or any number of other configurations. The memory unit 108 can include random access memory, read only memory, flash memory, or any other suitable memory systems. The main processor 104 may be connected through a system bus 140 to components including the memory 108, and the storage device 106.

The block diagram of FIG. 1 is not intended to indicate that the computing device 102 is to include all of the components shown in FIG. 1. Further, the computing device 102 may include any number of additional components not shown in FIG. 1, depending on the details of the specific implementation.

Figure 2:
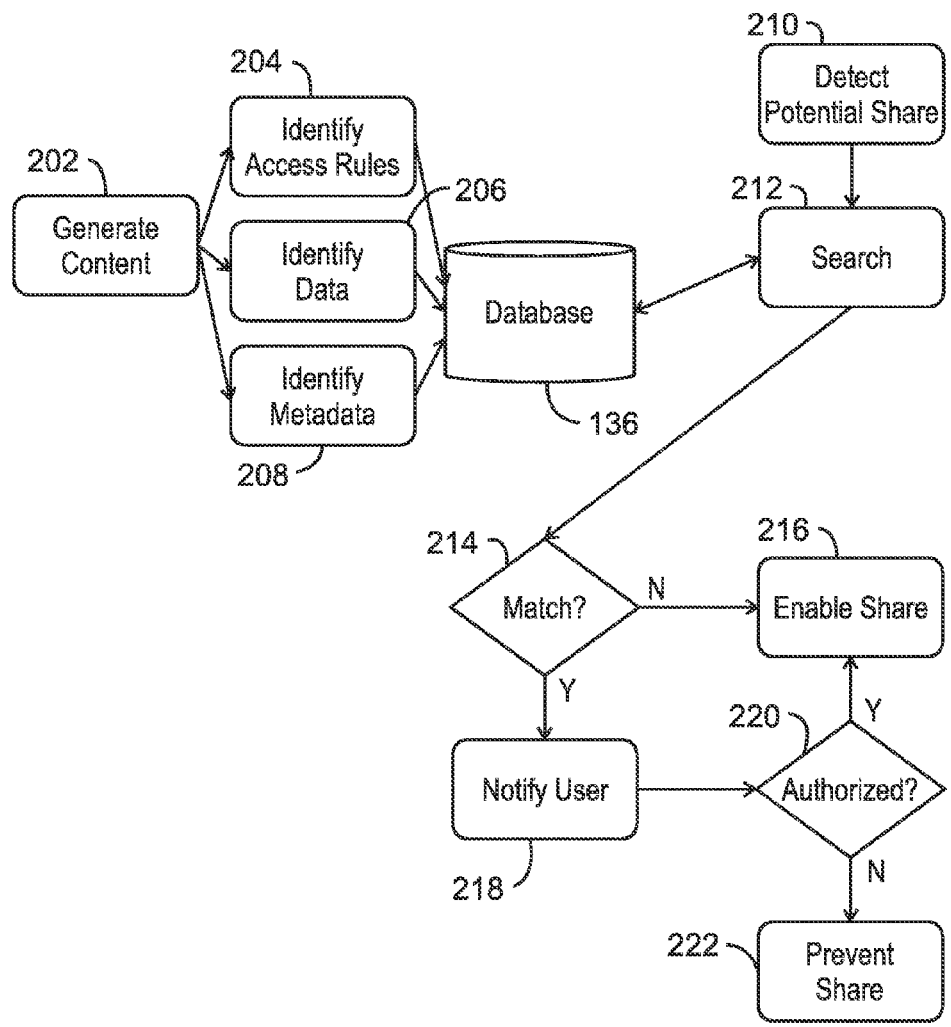
FIG. 2 is a flow diagram illustrating an example process of detecting potential private data and notifying a user in accordance with an embodiment of the invention.

FIG. 2 is a flow diagram illustrating an example process of detecting potential private data and notifying a user. At operation 202, content is generated. Content may be generated by an individual user, such as one of the users 126 or 130. A user may indicate access rules, and at operation 204 the access rules are identified. The access rules may be enforced by way of an administrator of a private group, such as the private group 128. For example, as content is generated within a private group, access rules may be enforced upon the content in some cases. At operation 206, the data of the content is identified. The data may be any format including textual format, audio format, video format, and the like. At operation 208, metadata of the content generated at operation 202 is identified. As discussed above, metadata may include descriptors of the content and the data itself such as a file name of the content, type of content, creation date, author, and the like. The access rules identified at operation 204, the data identified at operation 206, the metadata identified at operation 208, and the like may be provided to a central data store, such as the database 136 of FIG. 1.

At operation 210, a potential share is detected. The potential share may be detected by detecting when the content generated at operation 202, created by one or more members of the private group and shared among members of the private group, is being attempted to be shared outside of the private group. At operation 212, a search may be initiated to determine whether the potential share detected at operation 210 matches the metadata identified at operation 208, the content data identified at operation 206, and the like. The search may be a string search comparing text content, may be an audio search comparing audio content, may be an image search comparing visual content, or any combination thereof. Whether the potential share contains a match with the content generated at operation 202 may be determined at operation 214. Whether there is a potential match may be based on whether the potential share contains a (e.g., configurable) percentage of the data identified at operation 206, the metadata identified at operation 208, or any combination thereof. If there is no match, then the sharing is enabled at operation 216.

If a match is found, then at operation 218, a user may be notified of the attempt of the potential share detected at operation 210 to share material outside of a private domain. The user notified at operation 218 may include the user initiating the potential share in some cases. In other cases, the user notified at operation 218 may include the user associated with the content generation, such as an author of the content generated at operation 202. In this scenario, the user associated with the content generation may authorize the potential share, or deny the potential share, at operation 220. If the potential share is authorized at operation 220, then the share is enabled at operation 216, and, if not, then the potential share is prevented at operation 222. The techniques described herein may improve the functioning of a computing system implementing a social network such that private data may remain private by computer-implemented search and matching, as indicated at operation 212 and operation 214.

Although not illustrated in FIG. 2, a user initiating the potential share 210 may receive a notification of what specific data is being matched as private data. For example, the notification at operation 218 may include an indication of specific data in the potential share detected at operation 210 that matches data identified at operation 206, and that is restricted from being shared with a public domain. In this scenario, the user initiating the potential share may modify content of the potential share to remove the protected private data. In other words, the techniques described herein may improve the functioning of a computer-implemented social network by reducing the sharing of private content, while enabling machine identification of private content that may be removed from potential shares.

Figure 3:
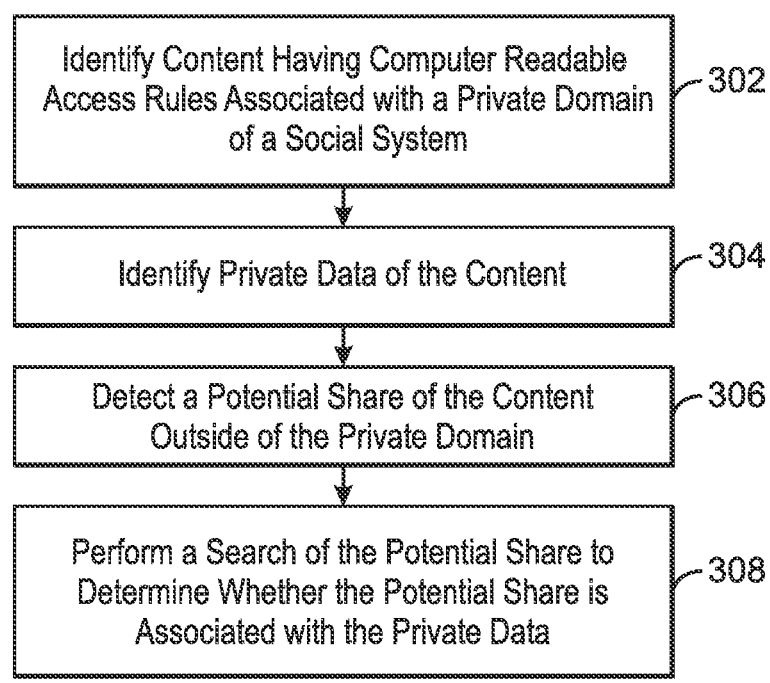
FIG. 3 is a flow diagram illustrating an example method of detecting potential private data in accordance with an embodiment of the invention.

FIG. 3 is a flow diagram illustrating an example method of detecting potential private data. At operation 302, content having computer readable access rules associated with a private domain of a social network are identified. At operation 304, private data of the content is identified, and at operation 306, a potential share of the content outside of the private domain is detected. At operation 308, a search is performed on the potential share to determine whether the potential share is associated with the private data.

In some cases, the method 300 may include notifying a user that the potential share violates the access rules. In some cases, the user is the owner of the content, and notifying the user includes requesting authorization for the potential share, in this scenario, the method 300 may also include postponing the potential share until authorization from the owner is received.

In some cases, performing the search of the potential share includes determining metadata of the potential share. Performing the search of the content to identify private data may include identifying a degree of overlap between the metadata associated with the content and the metadata of the potential share. In some cases, performing the search of the potential share to determine whether the potential share is associated with the private data includes searching a database, e.g., database 136, indicating the private data, wherein the database is associated with the private domain of the social network. In some cases, detecting the match includes determining a degree to which the potential share and the private data overlap.

Figure 4:
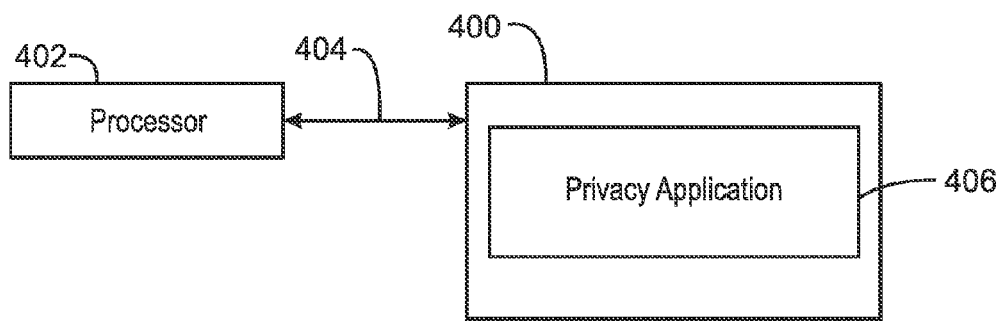
FIG. 4 is a block diagram depicting an example of a tangible, non-transitory computer-readable storage medium that may be used to detect potential sharing of private data in accordance with an embodiment of the invention.

FIG. 4 is a block diagram depicting an example of a tangible, non-transitory computer-readable storage medium that can be used to detect potential sharing of private data. The tangible, non-transitory, computer-readable medium 400 may be accessed by a processor 402 over a computer bus 404. Furthermore, the tangible, non-transitory, computer-readable medium 400 may include computer-executable instructions to direct the processor 402 to perform the steps of the current method.

The various software components discussed herein may be stored on the tangible, non-transitory, computer-readable medium 400, as indicated in FIG. 4. For example, a privacy application 406 may be configured to identify content having computer readable access rules associated with a private domain of a social network, and identify private data of the content. The privacy application 406 may further be configured to detect a potential share of the content outside of the private domain, perform a search of the potential share to determine whether the potential share is associated with the private data, and detect a match between the potential share and the private data.

The computing device 102 may communicate with social network 112 via a network. The network may be implemented by any number of any suitable communications media (e.g., wide area network (WAN), local area network (LAN), Internet, Intranet, etc.). Alternatively, computing device 102 may be local to social network 112, and may communicate via any appropriate local communication medium (e.g., local area network (LAN), hardwire, wireless link, Intranet, etc.).

Computing device 102 may be implemented by any conventional or other computer system(s) preferably equipped with a display or monitor, a base (e.g., including at least one processor 104, one or more memories 108 and/or internal or external network interfaces or communications devices 110 (e.g., modem, network cards, etc.)), optional input devices (e.g., a keyboard, mouse or other input device), and any commercially available and custom software (e.g., social network communications software, privacy module 114, crawling module 138, browser/interface software, etc.).

Privacy module 114 and crawling module 138 may include one or more modules or units to perform the various functions of present invention embodiments described above. The various modules (e.g., privacy module 114, crawling module 138, etc.) may be implemented by any combination of any quantity of software and/or hardware modules or units, and may reside within memory 108 of computing device 102 for execution by processor 104.

It will be appreciated that the embodiments described above and illustrated in the drawings represent only a few of the many ways of implementing embodiments for determining potential sharing of private data.

The environment of the present invention embodiments may include any number of computer or other processing systems (e.g., computing device(s) 102, social network(s) 112, public domain(s) 124, and private domain(s) 120, etc.) and database(s) 136 or other repositories arranged in any desired fashion, where the present invention embodiments may be applied to any desired type of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., social network communications software, privacy module 114, crawling module 138, browser/interface software, etc.). These systems may include any types of monitors and input devices (e.g., keyboard, mouse, voice recognition, etc.) to enter and/or view information that may be shared within a social network.

It is to be understood that the software (e.g., privacy module 114, crawling module 138, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computing devices and social networks, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., privacy module 114, crawling module 138, etc.) may be available on a non-transitory computer useable medium (e.g., magnetic or optical mediums, magneto-optic mediums, floppy diskettes. CD-ROM, DVD, memory devices, etc.) of a stationary or portable program product apparatus or device for use with systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., metadata 134, private data 122, access rules 118, user group 128, users 126 and 130, etc.). The database system may be implemented by any number of any conventional or other databases, data stores or storage structures (e.g., files, databases, data structures, data or other repositories, etc.) to store information (e.g., metadata 134, private data 122, access rules 118, user group 128, users 126 and 130, etc.). The database system may be included within or coupled to social network 112 or the computing device 102. The database systems and/or storage structures may be remote from or local to the computer or other processing systems, and may store any desired data (e.g., metadata 134, private data 122, access rules 118, user group 128, users 126 and 130, etc.).

The present invention embodiments may employ any number of any type of user interface (e.g., Graphical User Interface (GUI), command-line, prompt, etc.) for obtaining or providing information (e.g., metadata 134, private data 122, access rules 118, user group 128, users 126 and 130, potential share data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., private data 122, metadata 134, access rules 118, user group 128, users 126 and 130, potential share data, etc.).

The present invention embodiments are not limited to the specific tasks or algorithms described above, but may be utilized for determining the sharing, distribution or sending of private data in any network. For example, sharing may also include providing private information by email or by email attachment, by copying the private information to a public folder on a shared network drive, by downloading the private information to a portable memory device, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention, it will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for determining sharing of private data comprising:
   a storage device; and
   at least one processor configured to:
      identify content having computer readable access rules associated with a private domain of a social network;
      identify private data of the content;
      detect a potential share of the content outside of the private domain;
      perform a search of the potential share to determine whether the potential share is associated with the private data;
      detect a match between the potential share and the private data;
      notify a user associated with generation of the content of an attempt of the detected potential share in response to detecting the match, the notifying comprising requesting authorization from the user for the potential share; and
      prevent the potential share unless the user authorizes the potential share.

2. The system of claim 1, wherein the at least one processor is further configured to:
   notify a second user who requested the potential share that the potential share violates the access rules.

3. The system of claim 1, wherein the at least one processor is further configured to:
   enable the potential share after the authorization from the user is received.

4. The system of claim 1, wherein the at least one processor is further configured to:
   determine metadata of the potential share; and
   identify a degree of overlap between metadata associated with the content and the metadata of the potential share.

5. The system of claim 1, wherein the at least one processor is further configured to:
   determine a degree to which the potential share and the private data overlap.

6. The system of claim 5, wherein when at least a threshold percentage of the potential share overlaps with the private data then the match is detected.

7. The system of claim 6, wherein the threshold percentage is configurable.

8. The system of claim 2, wherein:
   wherein the at least one processor being configured to notify the second user further comprises the at least one processor being configured to provide an indication of specific data of the potential share identified as being matched to the private data, and
   after the notifying of the second user, the at least one processor is further configured to permit the second user to modify the potential share to remove the specific data that matches the private data.

9. The system of claim 1, wherein the at least one processor is further configured to:
   search a database indicating the private data, wherein the database is associated with the private domain of the social network.

10. A computer program product for determining sharing of private data, the computer program product comprising a computer readable storage medium having computer readable program instructions embodied therewith, the computer readable program instructions executable by a processor to cause the processor to:
    identify content having computer readable access rules associated with a private domain of a social network;
    identify private data of the content;
    detect a potential share of the content outside of the private domain;
    perform a search of the potential share to determine whether the potential share is associated with the private data;
    detect a match between the potential share and the private data;
    in response to detecting the match, notify a user associated with generation of the content of an attempt of the detected potential share, the notifying comprising requesting authorization from the user for the potential share; and
    prevent the potential share unless the user authorizes the potential share.

11. The computer program product of claim 10, wherein the computer readable program instructions cause the processor to:
    notify a second user who requested the potential share that the potential share violates the access rules.

12. The computer program product of claim 10, wherein the computer readable program instructions cause the processor to:
    determine metadata of the potential share; and
    identify a degree of overlap between metadata associated with the content and the metadata of the potential share.

13. The computer program product of claim 10, wherein the computer readable program instructions cause the processor to:
    determine a degree to which the potential share and the private data overlap.

14. The computer program product of claim 10, wherein the computer readable program instructions cause the processor to:
    search a database indicating the private data, wherein the database is associated with the private domain of the social network.

15. The computer program product of claim 13, wherein when at least a threshold percentage of the potential share overlaps with the private data then the match is detected.

16. The computer program product of claim 15, wherein the threshold percentage is configurable.

17. The computer program product of claim 11, wherein:
    the notifying the second user further comprises providing an indication of specific data of the potential share identified as being matched to the private data, and
    after the notifying of the second user, permitting the second user to modify the potential share to remove the specific data that matches the private data.

* * * * *